United States Patent
Hotra et al.

(10) Patent No.: US 8,966,478 B2
(45) Date of Patent: Feb. 24, 2015

(54) METHODS AND SYSTEMS FOR EXECUTING SOFTWARE APPLICATIONS USING HARDWARE ABSTRACTION

(75) Inventors: Jonathan Nicholas Hotra, St. Louis, MO (US); Donald Eugene Turner, Chesterfield, MO (US)

(73) Assignee: The Boeing Company, Chicago, IL (US)

( * ) Notice: Subject to any disclaimer, the term of this patent is extended or adjusted under 35 U.S.C. 154(b) by 305 days.

(21) Appl. No.: 13/170,601

(22) Filed: Jun. 28, 2011

(65) Prior Publication Data

US 2013/0007730 A1 Jan. 3, 2013

(51) Int. Cl.
*G06F 9/455* (2006.01)

(52) U.S. Cl.
CPC .. *G06F 9/45558* (2013.01); *G06F 2009/45566* (2013.01)
USPC ............................................................ 718/1

(58) Field of Classification Search
None
See application file for complete search history.

(56) References Cited

U.S. PATENT DOCUMENTS

| | | | |
|---|---|---|---|
| 5,956,474 A | 9/1999 | Bissett et al. | |
| 6,178,391 B1 | 1/2001 | Anderson et al. | |
| 6,253,135 B1 | 6/2001 | Hubacher | |
| 6,253,224 B1 | 6/2001 | Brice, Jr. et al. | |
| 6,332,215 B1 * | 12/2001 | Patel et al. | 717/141 |
| 6,496,847 B1 * | 12/2002 | Bugnion et al. | 718/1 |
| 6,629,162 B1 | 9/2003 | Arndt et al. | |
| 6,658,591 B1 | 12/2003 | Arndt | |
| 6,785,886 B1 * | 8/2004 | Lim et al. | 718/1 |
| 6,792,514 B2 | 9/2004 | Kapoor et al. | |
| 6,820,207 B2 | 11/2004 | Dawkins et al. | |
| 6,851,649 B1 | 2/2005 | Radford | |
| 6,876,864 B1 | 4/2005 | Chapin | |
| 6,877,158 B1 | 4/2005 | Arndt | |
| 6,883,116 B2 | 4/2005 | Lee et al. | |
| 6,895,501 B1 | 5/2005 | Salowey | |
| 7,003,771 B1 | 2/2006 | Arndt | |
| 7,174,545 B2 | 2/2007 | Keim et al. | |
| 7,272,681 B2 | 9/2007 | Davies | |
| 7,272,831 B2 | 9/2007 | Cota-Robles et al. | |
| 7,346,909 B1 | 3/2008 | Eldar et al. | |
| 7,562,349 B2 | 7/2009 | Fleischer et al. | |
| 7,607,129 B2 | 10/2009 | Rosu et al. | |
| 7,813,912 B1 * | 10/2010 | Sundararajan | 703/22 |
| 8,054,832 B1 * | 11/2011 | Shukla et al. | 370/389 |
| 2002/0184289 A1 | 12/2002 | Katoh et al. | |
| 2003/0037305 A1 * | 2/2003 | Chen et al. | 716/4 |
| 2003/0182032 A1 | 9/2003 | McWalter et al. | |

(Continued)

OTHER PUBLICATIONS

Goldberg, "Survey of Virtual Machine Research", Honeywell Information Systems and Harvard University, Jun. 1984, pp. 34-45.*

(Continued)

*Primary Examiner* — Charles Swift
(74) *Attorney, Agent, or Firm* — Armstrong Teasdale LLP

(57) ABSTRACT

Methods and systems for use in executing a software application using a virtual machine (VM). A hardware description language (HDL) description of a target hardware platform is determined. A programmable hardware component is configured to be functionally equivalent to the target hardware platform based on the HDL description. The software application is executed using the configured programmable hardware component, such as by executing the software application in a VM that is, in turn, executed by the configured programmable hardware component.

19 Claims, 6 Drawing Sheets

(56) References Cited

U.S. PATENT DOCUMENTS

| | | | |
|---|---|---|---|
| 2003/0182467 A1 | 9/2003 | Jensen et al. | |
| 2004/0206854 A1 | 10/2004 | Shah et al. | |
| 2004/0230712 A1 | 11/2004 | Belmar et al. | |
| 2005/0086587 A1* | 4/2005 | Balz | 715/505 |
| 2006/0206898 A1 | 9/2006 | Miner et al. | |
| 2006/0233168 A1* | 10/2006 | Lewites et al. | 370/389 |
| 2006/0242634 A1* | 10/2006 | Fleischer et al. | 717/148 |
| 2007/0028238 A1* | 2/2007 | Bennett et al. | 718/1 |
| 2007/0028244 A1 | 2/2007 | Landis et al. | |
| 2007/0038867 A1* | 2/2007 | Verbauwhede et al. | 713/186 |
| 2007/0174850 A1 | 7/2007 | El Zur | |
| 2007/0233775 A1 | 10/2007 | Jackson et al. | |
| 2007/0277175 A1 | 11/2007 | Lutter | |
| 2007/0300218 A1 | 12/2007 | Mann | |
| 2008/0098194 A1 | 4/2008 | Hashimoto et al. | |
| 2008/0155153 A1 | 6/2008 | Yoshii et al. | |
| 2008/0178261 A1 | 7/2008 | Yao et al. | |
| 2008/0184193 A1* | 7/2008 | Devins et al. | 717/104 |
| 2008/0189700 A1 | 8/2008 | Schmidt et al. | |
| 2008/0196043 A1 | 8/2008 | Feinleib et al. | |
| 2008/0209279 A1 | 8/2008 | Van Riel et al. | |
| 2008/0301676 A1 | 12/2008 | Alpern et al. | |
| 2009/0083734 A1* | 3/2009 | Hotra | 718/1 |
| 2010/0122343 A1* | 5/2010 | Ghosh et al. | 726/23 |
| 2011/0072428 A1* | 3/2011 | Day et al. | 718/1 |
| 2012/0260247 A1* | 10/2012 | Huang et al. | 718/1 |

OTHER PUBLICATIONS

European Search Report of Application No. 12174226.6—1243; Sep. 14, 2012; 9 pages.
Goldberg, R.; Survey of Virtual Machine Research; Computer, IEEE Service Center; Jun. 1, 1974; pp. 34-45; vol. 7, No. 6; Alamitos, CA, US.
Wlad, J.; Software Rescue: A Safety-Critical Primer; IEEE A&E Systems Magazine; Apr. 2007; pp. 18-22.
TenAsys Real-time Hypervisor; Host Real-time and General-purpose Operating Systems on a Single Hardware Platform with Intel® Virtualization Technology; www.tenasys.com; Aug. 2006; pp. 1-11.
Brian, T.; Software Certification and Standards: What Every Device Manufacturer Should Know; www.embedded.com; Sep. 21, 2006; pp. 1-9.
Adding it Up: Virtualization Reduces IT Costs; IBM Virtualization View; http://www.03.ibm.com/systems/virtualization/view/031407.html; 3 pages.
Enhanced Virtualization on Intel® Architecture-based Servers; Intel®; http://www.intel.com/business/bss/products/server/vitualization_wp.pdf; 2006; 12 pages.
Adams, K., et al.; A Comparison of Software and Hard Techniques for x86 Virtualization; ASPLOS'06; Oct. 21-25, 2006; http://www.vmware.com/vmtn/resources/528; 12 pages.
Shankland, S.; Linux Heavies Plan Lightweight Virtualization; http://www.news.com//Linux+heavies+plan +lightweight+virtualization/2100-7339_3-6108272.html; Mar. 14, 2007; 3 pages.
Native Virtualization; http://en.wikipedia.org/wiki/Native_virtualization; last modified Jul. 6, 2007; 2 pages.
X86 Virtualization; http://en.wikipedia.org/wiki/X86_virtualization; last modified Sep. 13, 2007; 6 pages.
Vance, A.; Microsoft Starts Supporting, er, Linux; The Register; http://theregister.co.uk/2006/04/03/ms_virtual_free/; Apr. 3, 2006; 5 pages.
Vance, A.; Microsoft Promises to Give Away Key Virtualization Spec; The Register; http://theregister.co.uk/2006/10/17/microsoft_vhd_away/; Oct. 17, 2006; 2 pages.
Virtualization in Linux—KVM and Xen; Intel® open Source Technology Center; http://oss.org.cn/2007-OSS-CONF/2007-sub-bbs/7.pdf; Jun. 5, 2007; 16 pages.

Van Doorn, L; Hardware Virtualization Trends; IBM; T.J. Watson Research Center; Jun. 14, 2006; https://db.usenix.org/events/vee06/full_papers/vandoorn-keynote.pdf; 44 pages.
Abramson, D. et al.; Intel® Virtualization Technology for Directed I/O; Intel Technology Journal; Aug. 10, 2006; vol. 10, Issue 03; pp. 179-192.
Neiger, G. et al.; Intel® Virtualization Technology: Hardware Support for Efficient Processor Virtualization; Intel Technology Journal; Aug. 10, 2006; vol. 10, Issue 03; pp. 167-178.
Intel® Trusted Execution Technology; Intel®; http://www.intel.com/technology/security/downloads/trusted_exectech_over_pdf; 2 pages.
Xen; http://en.wikipedia.org/wiki/Xen; last modified Sep. 22, 2007; 5 pages.
Open VZ; http://en.wikipedia.org/wiki/OpenVZ; last modified Sep. 24, 2007; 5 pages.
QEMU; http://en.wikipedia.org/wiki/Qemu; last modified Sep. 21, 2007; 4 pages.
Bottemley, J.; Virtualization Changes in 2.6.21; http://virtualization.sys-con.com/read/382928.htm; May 31, 2007; 2 pages.
VMware Introduces Support for Cross-Platform Paravirtualization; http://www.vmware.com/company/news/releases/050907PV.html; May 9, 2007; 2 pages.
Davis, M.; Virtual PC vs. Virtual Server: Comparing Features and Users; Microsoft Corp.; http://www.microsoft.com/windowsserversystem/virtualserver/techinfo/vsysvpc.mspx; May 2005; 13 pages.
Windows Server Virtualization; http://en.wikipedia.org/wiki/Windows_Server_Virtualization; last modified Jun. 17, 2007; 2 pages.
Windows Server Virtualization—An Overview; http://www.microsoft.com/windowsserversystem/virtualserver/techinfo/virtualization.mspx; May 2006; 12 pages.
RTS Real-Time Hypervisor; Real Time Systems; http://www.real-time-systems.com/real-time_hypervisor/index.php; Feb. 12, 2007; 2 pages.
TRANGO Introduction to Virtualization; TRANGO Virtual Processors; http://www.trango-vp.com/documentation/virtualization/into.php; 3 pages.
Meeting the Challenges of Connected Device Design Through Real-Time Virtualization™; VirtualLogix; http://www.virtuallogix.com/uploads/media/VLX_WhitePaper_Virtualization_for_Connected_Devices_04.pdf; 2006; 12 pages.
Improved Service Delivery in Network Infrastructure Through Real-Time Virtualization™ on Intel® Virtualization Technology; Virtual-Logix; http://www.virtuallogix.com/uploads/media/VLX_WhitePaper_VirtualizationIntelVT_for_NI_02.pdf; 2006; 12 pages.
ARINC6653 (ARINC 653-1); LynuxWorks; http://www.lynuxworks.com/solutions/milaero.arinc-653.php; 3 pages.
Green Hills Software Extends Integrity PC to Enable the Integration of Windows Applications in Secure Systems; Green Hill Software, Inc.; http://www.ghs.com/news/20050419_secure_integrity_pc.html; Apr. 19, 2005; 3 pages.
Integrity Padded Cell Secure Virtualization Solution; Green Hill Software, Inc.; http://www.ghs.com/download/datasheets/INTEGRITY_PC.pdf; 2 pages.
Vaughn-Nichols, S.J.; New Approach to Virtualization is a Lightweight; Computer; Nov. 2006; IEEE Computer Society; vol. 39; Issue 11; pp. 12-14.
Uhlig, R.; Intel Virtualization Technology; Computer; May 2005; IEEE Computer Society; vol. 38; Issue 5; pp. 48-56.
The Top Five Virtualization Mistakes; Vyatta; http://www.vyatta.com/sites/vyatta.com/files/pdfs/Vyatta_BiggestVirtualizationMistakes.pdf; 2007; 8 pages.

* cited by examiner

METHODS AND SYSTEMS FOR EXECUTING SOFTWARE APPLICATIONS USING HARDWARE ABSTRACTION

BACKGROUND OF THE INVENTION

This invention relates generally to reutilization of existing software, and more specifically, to methods and systems for executing software applications (e.g., certified software applications) using hardware abstraction.

Existing software applications are associated with hundreds of billions of lines of source code that have been written over time. Such source code is generally converted (e.g., compiled) into object code that is executable by a particular physical hardware platform. Physical hardware devices eventually become obsolete. Once this hardware obsolescence occurs, it may no longer be feasible to acquire a particular hardware platform even if the desired functionality remains in the original design. The producer of a system typically has no control over when a hardware manufacture decides to discontinue production of their hardware chips. Accordingly, using traditional software development and delivery methods, a software application that is associated with a specific hardware platform may have to be re-implemented (e.g., rewritten) when the target hardware platform becomes obsolete, especially if the source code of the software application is no longer available.

Further, some software applications must be certified with respect to a target hardware platform prior to use of the software application in a mission-critical context. Certification of such software on a new hardware platform may introduce significant delay and/or cost into the process of delivering the software for use while adding no additional functional value.

BRIEF DESCRIPTION OF THE INVENTION

In one aspect, a method for use in executing a software application that is certified to be executed by a target hardware platform is provided. The method includes determining a hardware description language (HDL) description of the target hardware platform. A hardware component is configured to be functionally equivalent to the target hardware platform based on the HDL description. The software application is executed using the configured hardware component.

In another aspect, a device for use in executing a software application using a virtual machine (VM) is provided. The device includes a storage device and a programmable hardware component coupled to the storage device. The storage device is configured to store a virtual machine (VM) and a software application. The programmable hardware component is programmed based on a hardware description language (HDL) description of a target hardware platform. The programmable hardware component is programmed to execute the software application, which is certified to be executed by at least one of the target hardware platform and the HDL description.

In yet another aspect, a method for use in executing a software application using a virtual machine (VM) is provided. The method includes selecting a target hardware platform for execution of the VM. A hardware description language (HDL) description of the target hardware platform is determined. A programmable hardware component is programmed based on the HDL description, and the VM is executed using the programmed programmable hardware component.

DETAILED DESCRIPTION OF THE INVENTION

Embodiments provided herein facilitate reusing legacy software on new hardware platforms by taking advantage of hardware abstraction provided by hardware description language (HDL) and virtualization. More specifically, virtualization and hardware description language (HDL) descriptions of hardware platforms may be used to achieve a hardware and software platform that can be used for a prolonged duration (e.g., decades) that may be longer than the useful life of a particular hardware platform. Such embodiments may further enable such continued use of software even when the source code for the software is no longer available and/or without the expense involved in certifying the software with respect to a new hardware platform.

Figure 1:
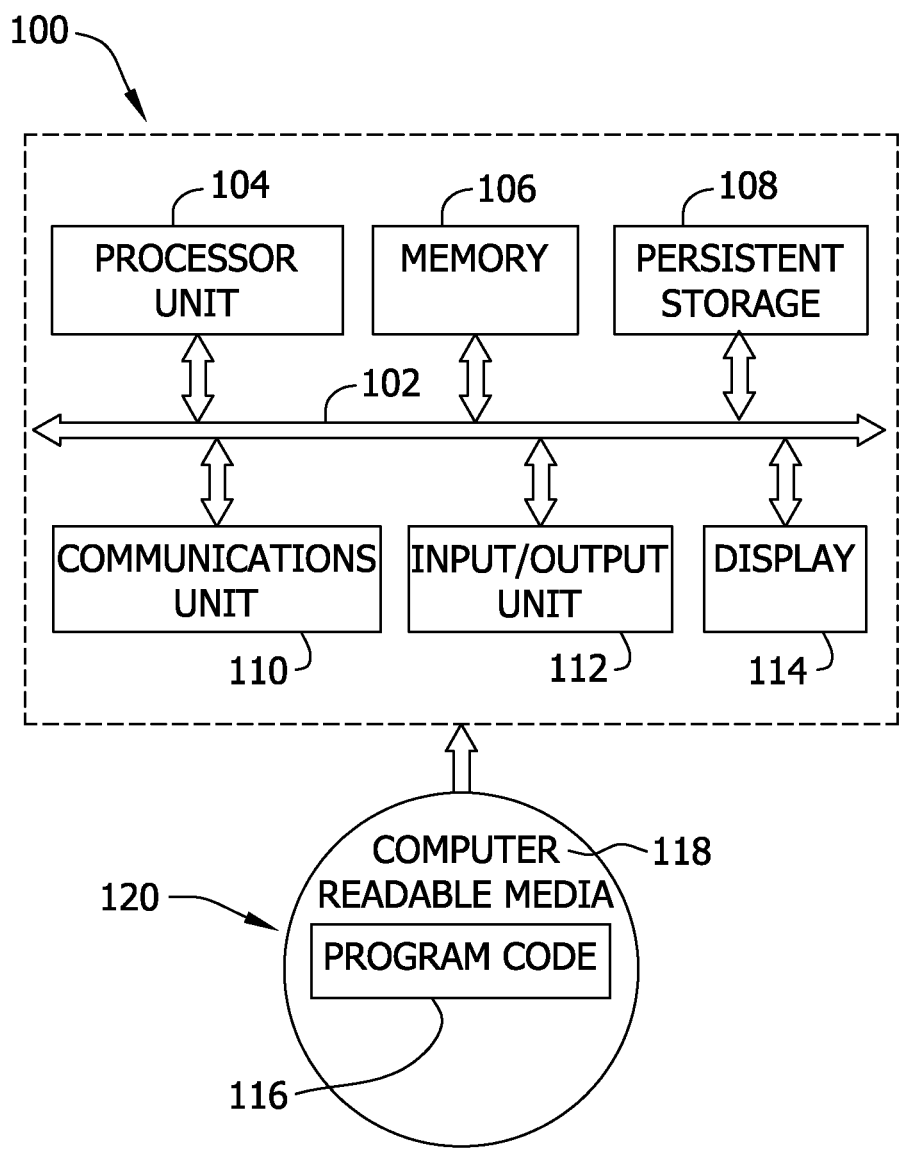
FIG. 1 is a block diagram of an exemplary computing device.

FIG. 1 is a block diagram of an exemplary computing device 100. In the exemplary embodiment, computing device 100 includes communications fabric 102 that provides communications between a processor unit 104, a memory device 106, persistent storage 108, a communications unit 110, an input/output (I/O) unit 112, and a presentation interface, such as a display 114. In addition to, or in alternative to, the presentation interface may include an audio device (not shown) and/or any device capable of conveying information to a user.

Processor unit 104 executes instructions for software that may be loaded into memory device 106. Processor unit 104 may be a set of one or more processors or may include multiple processor cores, depending on the particular implementation. Further, processor unit 104 may be implemented using one or more heterogeneous processor systems in which a main processor is present with secondary processors on a single chip. In another embodiment, processor unit 104 may be a homogeneous processor system containing multiple processors of the same type.

Memory device 106 and persistent storage 108 are examples of storage devices. As used herein, a storage device is any piece of hardware that is capable of storing information either on a temporary basis and/or a permanent basis. Memory device 106 may be, for example, without limitation, a random access memory and/or any other suitable volatile or non-volatile storage device. Persistent storage 108 may take various forms depending on the particular implementation, and persistent storage 108 may contain one or more components or devices. For example, persistent storage 108 may be a hard drive, a flash memory, a rewritable optical disk, a rewritable magnetic tape, and/or some combination of the above. The media used by persistent storage 108 also may be removable. For example, without limitation, a removable hard drive may be used for persistent storage 108.

A storage device, such as memory device 106 and/or persistent storage 108, may be configured to store data for use with the processes described herein. For example, a storage device may store one or more software applications (e.g., including source code and/or computer-executable instructions) such as a virtual machine and/or other software application and/or any other information suitable for use with the methods described herein.

Communications unit 110, in these examples, provides for communications with other computing devices or systems. In exemplary embodiments, communications unit 110 includes one or more network interface cards. Communications unit 110 may provide communications through the use of physical and/or wireless communication links.

Input/output unit 112 enables input and output of data with other devices that may be connected to computing device 100. For example, without limitation, input/output unit 112 may provide a connection for user input through a user input device, such as a keyboard and/or a mouse. Further, input/output unit 112 may send output to a printer. Display 114 provides a mechanism to display information to a user. For example, a presentation interface such as display 114 may display a graphical user interface, such as those described herein.

Instructions for the operating system and applications or programs are located on persistent storage 108. These instructions may be loaded into memory device 106 for execution by processor unit 104. The processes of the different embodiments may be performed by processor unit 104 using computer implemented instructions and/or computer-executable instructions, which may be located in a memory, such as memory device 106. These instructions may be referred to as program code (e.g., object code and/or source code) that may be read and executed by a processor in processor unit 104. The program code in the different embodiments may be embodied on different physical or tangible computer readable media, such as memory device 106 or persistent storage 108.

Program code 116 may be located in a functional form on one or more storage devices (e.g., memory device 106, persistent storage 108, and/or computer readable media 118) that are selectively removable and may be loaded onto or transferred to computing device 100 for execution by processor unit 104. Program code 116 and computer readable media 118 form computer program product 120 in these examples. In one example, computer readable media 118 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer readable media 118 also may take the form of a hard drive, a thumb drive, or a flash memory that is connected to computing device 100. The tangible form of computer readable media 118 is also referred to as computer recordable storage media. In some instances, computer readable media 118 may not be removable.

Alternatively, program code 116 may be transferred to computing device 100 from computer readable media 118 through a communications link to communications unit 110 and/or through a connection to input/output unit 112. The communications link and/or the connection may be physical or wireless in the illustrative examples. The computer readable media also may take the form of non-tangible media, such as communications links or wireless transmissions containing the program code.

In some illustrative embodiments, program code 116 may be downloaded over a network to persistent storage 108 from another computing device or computer system for use within computing device 100. For instance, program code stored in a computer readable storage medium in a server computing device may be downloaded over a network from the server to computing device 100. The computing device providing program code 116 may be a server computer, a workstation, a client computer, or some other device capable of storing and transmitting program code 116.

Program code 116 may be organized into computer-executable components that are functionally related. For example, program code 116 may include a virtual machine, a software application, a hypervisor, and/or any component suitable for the methods described herein. Each component may include computer-executable instructions that, when executed by processor unit 104, cause processor unit 104 to perform one or more of the operations described herein.

The different components illustrated herein for computing device 100 are not meant to provide architectural limitations to the manner in which different embodiments may be implemented. The different illustrative embodiments may be implemented in a computer system including components in addition to or in place of those illustrated for computing device 100. For example, other components shown in FIG. 1 can be varied from the illustrative examples shown.

As one example, a storage device in computing device 100 is any hardware apparatus that may store data. Memory device 106, persistent storage 108 and computer readable media 118 are examples of storage devices in a tangible form.

In another example, a bus system may be used to implement communications fabric 102 and may include one or more buses, such as a system bus or an input/output bus. Of course, the bus system may be implemented using any suitable type of architecture that provides for a transfer of data between different components or devices attached to the bus system. Additionally, a network interface may include one or more devices used to transmit and receive data, such as a modem or a network adapter. Further, a memory may be, for example, without limitation, memory device 106 or a cache such as that found in an interface and memory controller hub that may be present in communications fabric 102.

Figure 2:
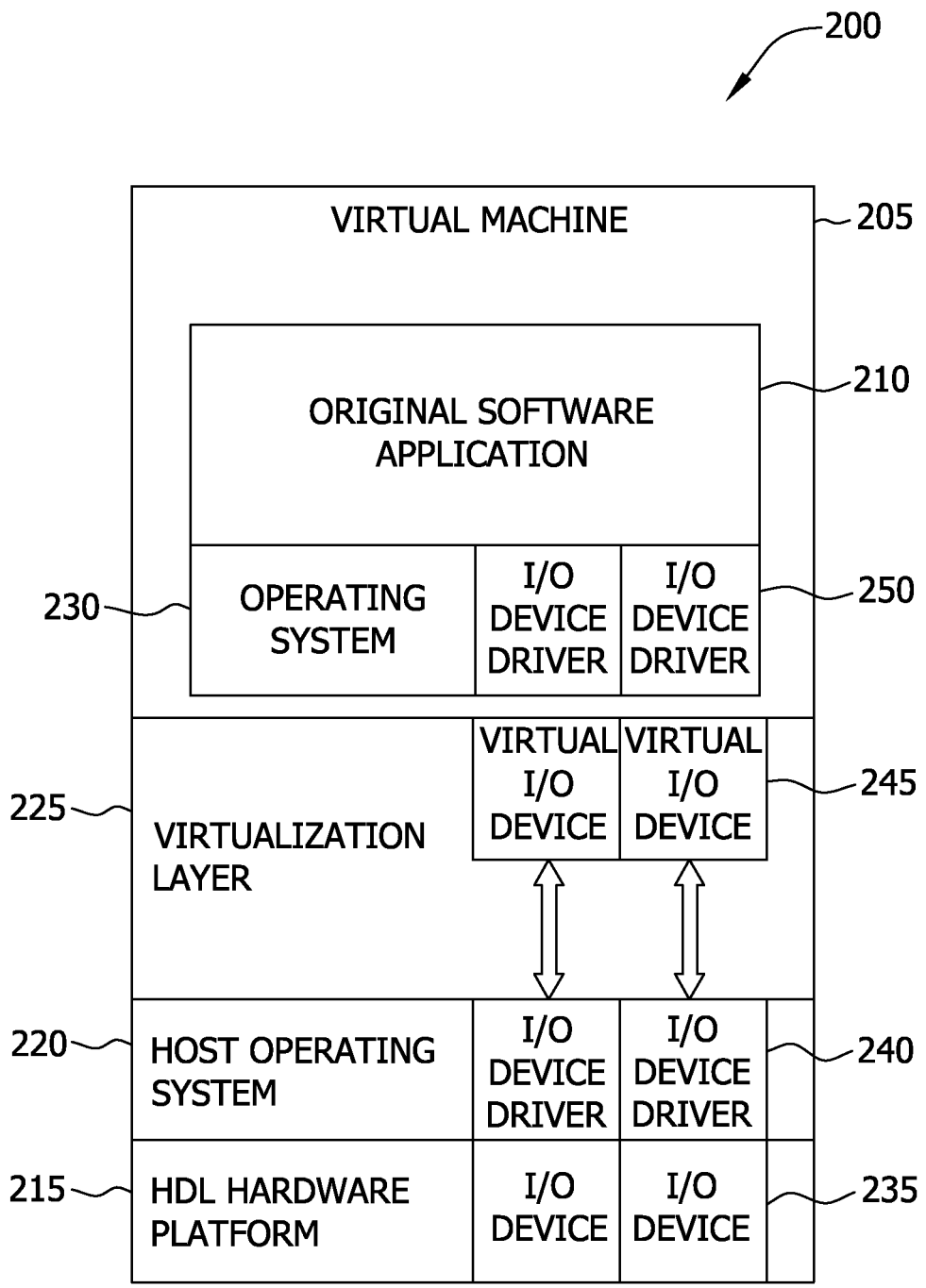
FIG. 2 is a block diagram of an exemplary configuration of a computing device that may be used to execute a software application using a virtual machine.
Figure 3:
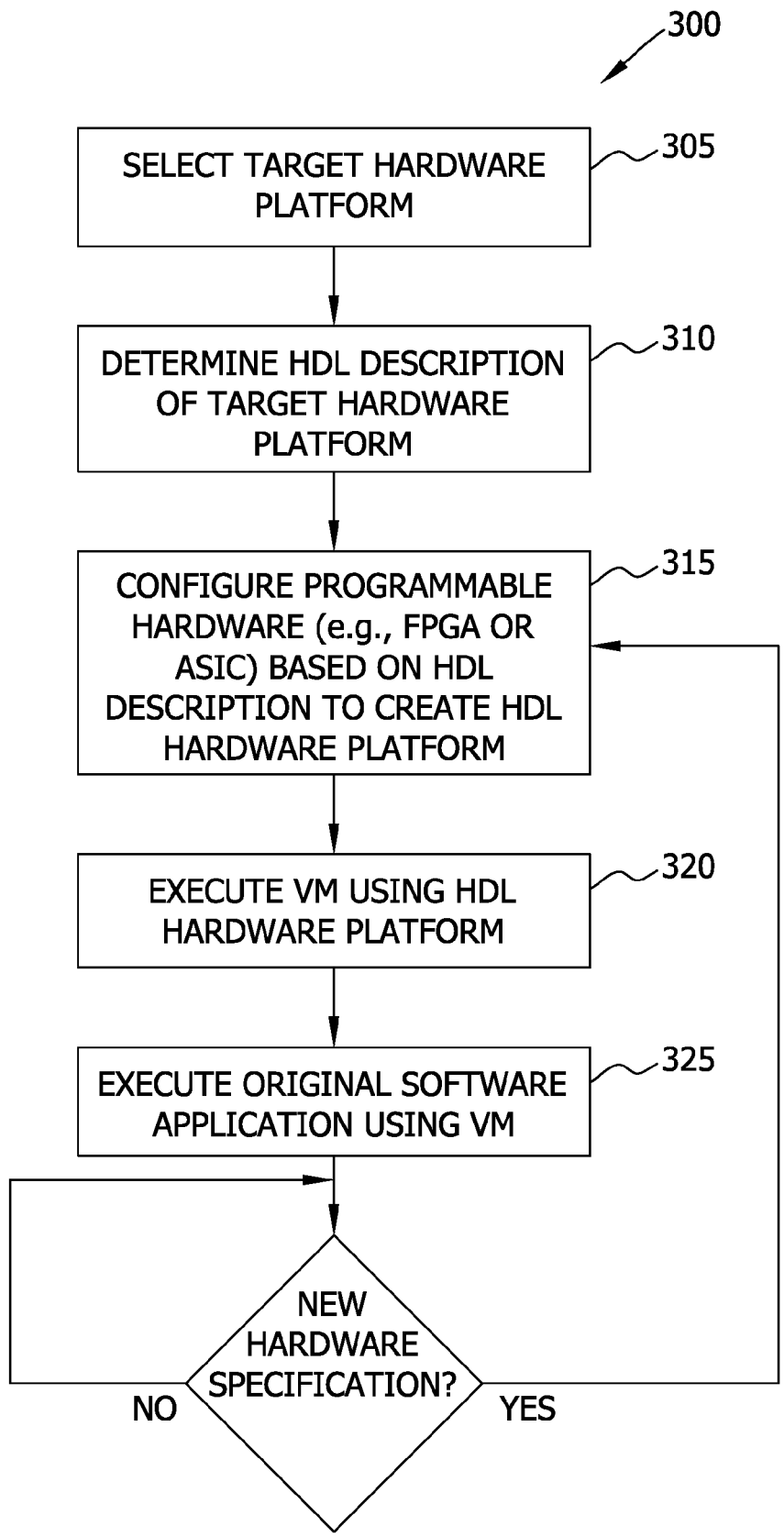
FIG. 3 is a flowchart of an exemplary method for use in executing a software application using a VM.

FIG. 2 is a block diagram of an exemplary configuration 200 of a computing device (e.g., computing device 100) that may be used to execute a software application using a virtual machine (VM). FIG. 3 is a flowchart of an exemplary method for use in executing a software application using a VM 205.

Referring to FIGS. 2 and 3, in exemplary embodiments, a target hardware platform is selected 305 for execution of the VM and/or an original software application 210. For example, the target hardware platform may be a hardware platform on which software application 210 is currently executed directly and/or a hardware platform on which software application 210 is currently executed by VM 205. In addition, or alternatively, the target hardware platform may be a hardware platform on which VM 205 is desired to execute. In some embodiments, the target hardware platform is associated with an instruction set architecture (ISA) and/or a microarchitecture that implements an ISA.

A hardware description language (HDL) description of the target hardware platform is determined 310. For example, the HDL description may be obtained from a provider (e.g., a manufacturer) of the target hardware platform, created based on a sample of the target hardware platform, and/or created based on desired operation of a new hardware platform. The HDL description may be understood as an abstraction of the target hardware platform (e.g., a microarchitecture).

A hardware component, such as a programmable hardware component and/or a processor, is configured (e.g., programmed and/or created) 315 based on the HDL description. For example, a programmable hardware component may include, without limitation, a programmable logic device (PLD), a field programmable gate array (FPGA), a programmable logic array (PLA), and/or any device that may be used to create reconfigurable digital circuits. A programmable hardware component may be programmed based on the HDL description. In addition, or alternatively, a processor, such as an application specific integrated circuit (ASIC), may be created based on the HDL description. The configured hardware component may be referred to as an HDL hardware platform 215.

In exemplary embodiments, configuring 315 the hardware component based on the HDL description includes configuring the hardware component to be at least partially functionally equivalent to the target hardware platform described by the HDL description, such that a certification of software application 210 for execution by the target hardware platform may be applicable to execution of software application 210 by HDL hardware platform 215.

In addition to functional equivalence to the target hardware platform, HDL hardware platform 215 may include features not included in the target hardware platform. In some embodiments, the hardware component is configured 315 with emulation acceleration, such that this acceleration is included in HDL hardware platform 215. Emulation acceleration may be valuable for virtual platform software development designs, where a virtual platform represents an abstraction of underlying hardware. For example, virtual platforms may be used to develop software for embedded systems. Conventional virtual platforms may execute significantly more slowly than (e.g., at less than 10% the speed of) the underlying hardware, generally slowing the software development process.

In some embodiments, an emulation accelerator is added to HDL hardware platform 215 by adding additional assembly instructions to a core processor. In one example, an assembly instruction, such as an "add immediate" ("addi") instruction, corresponding to the target hardware platform is implemented in a software function. In conventional emulation, the software function may be compiled for a second hardware platform. To achieve emulation acceleration, the logic of the software function may be implemented as an assembly instruction, such as "thp_addi", in the HDL description. Accordingly, configuring 315 the hardware component would cause HDL hardware platform 215 to include an implementation of the assembly instruction. In exemplary embodiments, the emulation acceleration included in the HDL description handles registers and state information in the HDL description itself. Interrupts and software faults may also be coordinated by logic in the HDL description. Further, where resources in HDL hardware platform 215 are limited, a physical memory and stack may be positioned separate from HDL hardware platform 215, and a memory management unit for the emulated processor may be included in the HDL description.

In some embodiments, a Read-Decode-Execute emulation method is used with an emulation accelerator. Although all the virtualization and emulation could be moved into the HDL description, in some embodiments, only the processor emulation is implemented in the HDL description, and other features, such as I/O devices, are omitted from the HDL description.

Software application 210 is executed using HDL hardware platform 215. In exemplary embodiments, VM 205 is executed 320 the VM using HDL hardware platform 215, and software application 210 is executed 325 using VM 205. More specifically, VM 205 may be executed by a host operating system (OS) 220 that is executed directly by HDL hardware platform 215. Host OS 220 executes a virtualization layer 225 for VM 205, which executes a guest OS 230 that may be the same as or different from host OS 220. Guest OS 230, in turn, executes software application 210.

Virtualization layer 225 and/or VM 205 provide to guest OS 230 an abstraction of HDL hardware platform 215 that may be referred to as "virtualized" hardware. Virtualized hardware may include an abstraction of any components included in a computing device 100 (shown in FIG. 1), such as, but not limited to, processor unit 104 and memory 106.

In some embodiments, HDL hardware platform 215 includes a plurality of input/output (I/O) devices 235 (e.g., as provided by input/output unit 112, shown in FIG. 1) that facilitate interaction with devices such as sensors, user input devices, controlled devices (e.g., motors), and/or any other device that may provide input to and/or receive output from computing device 100 (shown in FIG. 1). I/O devices 235 may include serial communication ports and/or parallel communication ports, for example.

Host OS 220 includes I/O device drivers 240, which may be used by software executed by host OS 220 to access I/O devices 235. In exemplary embodiments, virtualization layer 225 provides virtual I/O devices 245 that correspond to or "map to" I/O devices 235 via I/O device drivers 240. Accordingly, virtualization layer 225 provides an abstraction of I/O devices 235 to VM 205. Similar to host OS 220, guest OS 230 includes I/O device drivers 250, which may be used by software executed by guest OS 230 to access virtual I/O devices 245. In some embodiments, different types of I/O devices are mapped to each other. For example, a virtual Universal Serial Bus (USB) device may be mapped to a physical Ethernet device with a translation occurring in virtualization layer 225.

Notably, because VM 205 accesses only virtualized hardware provided by virtualization layer 225, VM 205 and software executed by VM 205 (e.g., guest OS 230 and/or software application 210) may be insulated from (e.g., unaffected by) changes to the physical hardware underlying virtualization layer 225. In exemplary embodiments, the target hardware platform may be considered a first hardware platform, and software application 210 is associated with (e.g., executable by) a second hardware platform that is different from the first hardware platform. VM 205 is configured to provide to software application 210 a virtual hardware platform that emulates the second hardware platform. Accordingly, even if source code associated with guest OS 230 and/or software application 210 is unavailable, or infeasible to modify for execution by a new hardware platform, such software may be executed by VM 205.

In exemplary embodiments, software application 210 is certified to be executed by the target hardware platform and/or by one or more devices (e.g., another HDL hardware platform 215) that are configured based on the HDL description that describes the target hardware platform. For example, comprehensive validation and/or verification tests of software application 210 may have been successfully completed with software application 210 executed by the target hardware platform. In such embodiments, that certification of software application 210 with respect to execution by the target hardware platform may be applicable to execution of the software application by HDL hardware platform 215. Accordingly, at least some effort (e.g., validation and/or verification testing) associated with the certification process may be obviated.

In some embodiments, method 300 is performed repeatedly. In one scenario, the hardware component that has been configured 315 based on the HDL description may become unavailable. For example, the provider (e.g., manufacturer) of the hardware component may cease production of the hardware component. In such a scenario, the originally configured, or first, hardware component is associated with a first hardware specification, and it may be desired to execute software application 210 by a replacement, or second, hardware component associated with a second hardware specification. For example, the second hardware component may be a revision to the first hardware component or may be unrelated to the first hardware component.

Because the HDL description of the target hardware platform has already been determined 310, in such embodiments, compatibility of software application 210 with the second hardware component may be achieved by configuring 315 the second hardware component based on the HDL description, as described above, creating a second HDL hardware platform 215. In exemplary embodiments, configuring 315 the second hardware component based on the same HDL description used to configure 315 the first hardware component causes the second hardware component to be functionally equivalent to the first hardware component. Accordingly, as described above, if software application 210 is certified for execution by the first hardware component, and configuring 315 the second hardware component to be functionally equivalent to the first hardware component may cause this certification to be applicable to execution of software application 210 by the second hardware component.

In such a scenario, the first hardware component may be considered to execute a first instance of VM 205, which executes a first instance of software application 210. With the second hardware component configured 315 as described above, a second instance of VM 205 may be executed 320 using the second hardware component, and a second instance of software application 210 may be executed 325 using this second instance of VM 205.

Figure 4:
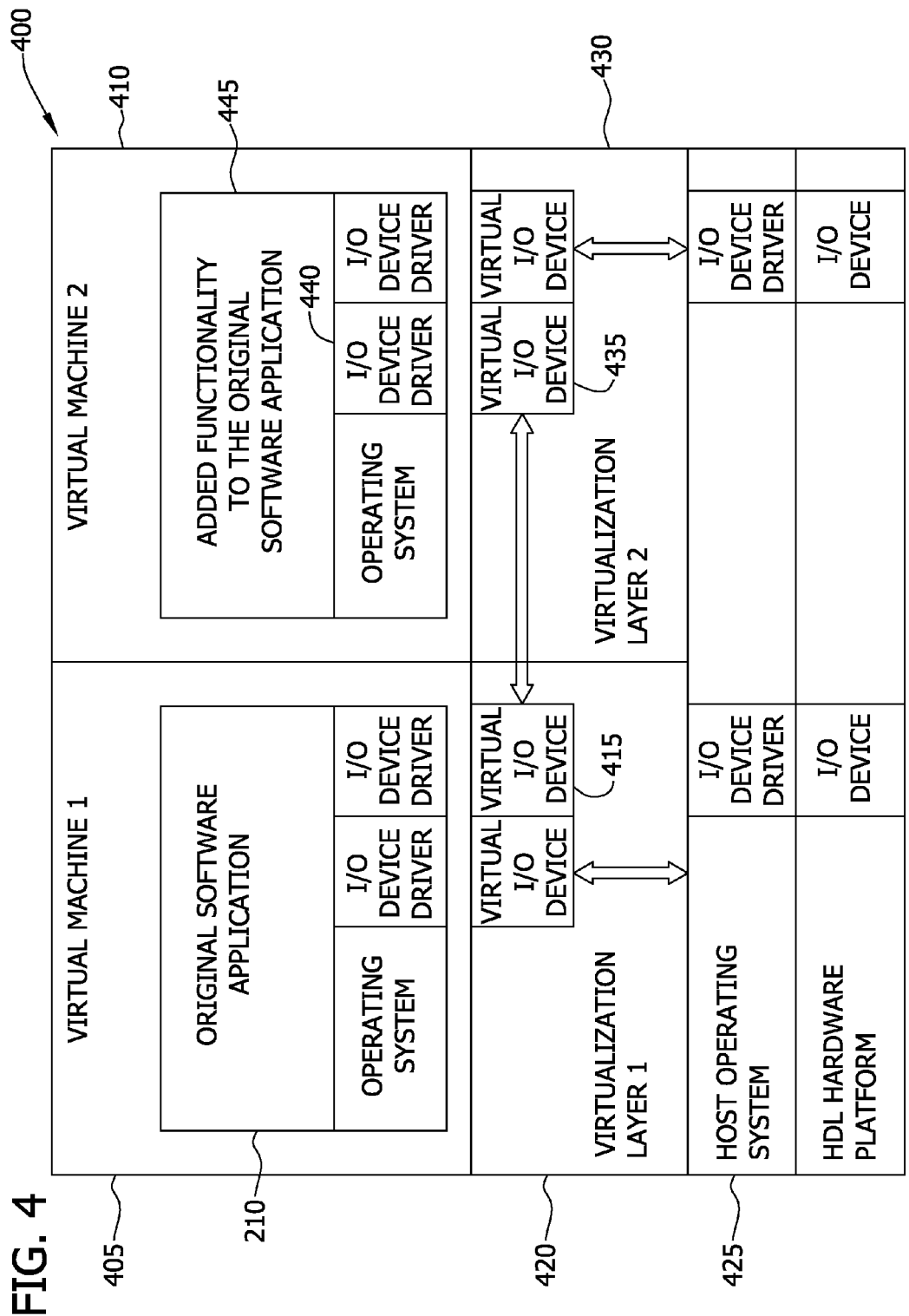
FIG. 4 is a block diagram of an exemplary configuration of a computing device that may be used to add functionality to a software application using a second virtual machine executed by a host operating system.

In some embodiments, functionality not included in software application 210 is added without directly modifying software application 210. FIG. 4 is a block diagram of an exemplary configuration 400 of a computing device that may be used to add functionality to software application 210, which is executed by a first VM 405, using a second virtual machine 410 executed by host operating system 220.

In the embodiment shown in FIG. 4, a first VM 405 executes original software application 210, as described above. Operation of software application 210 is extended through a first virtual I/O device 415 provided to first VM 405 by a first virtualization layer 420. First virtualization layer 420 is executed by a host OS 425, which also executes a second virtualization layer 430. Second virtualization layer 430 provides a second virtual I/O device 435, which is mapped to first virtual I/O device 415, to a second VM 410, which accesses second virtual I/O device 435 via an I/O device driver 440.

A second software application 445 is executed by second VM 410 and provides additional functionality that is not included in original software application 210. Such addition functionality may be enabled, at least in part, by routing data between original software application 210 and second software application 445 using first virtual I/O device 415 and second virtual I/O device 435. In exemplary embodiments, second software application 445 receives data (e.g., commands and/or requests) from software application 210 and responds to such data based on requirements and/or rules implemented in second software application 445. For example, software application 210 may transmit a command intended for a controlled device to first virtual I/O device 415. The command may be routed to second software application 445 by first virtual I/O device 415 via second virtual I/O device 435. Second software application 445 may pass the command through to the original destination (e.g., the controlled device) or may modify and/or block the command based on the requirements and/or rules implemented in second software application 445. Further, second software application 445 may transmit a response to original software application 210 via second virtual I/O device 435 and first virtual I/O device 415 based on such requirements and rules.

Figure 5:
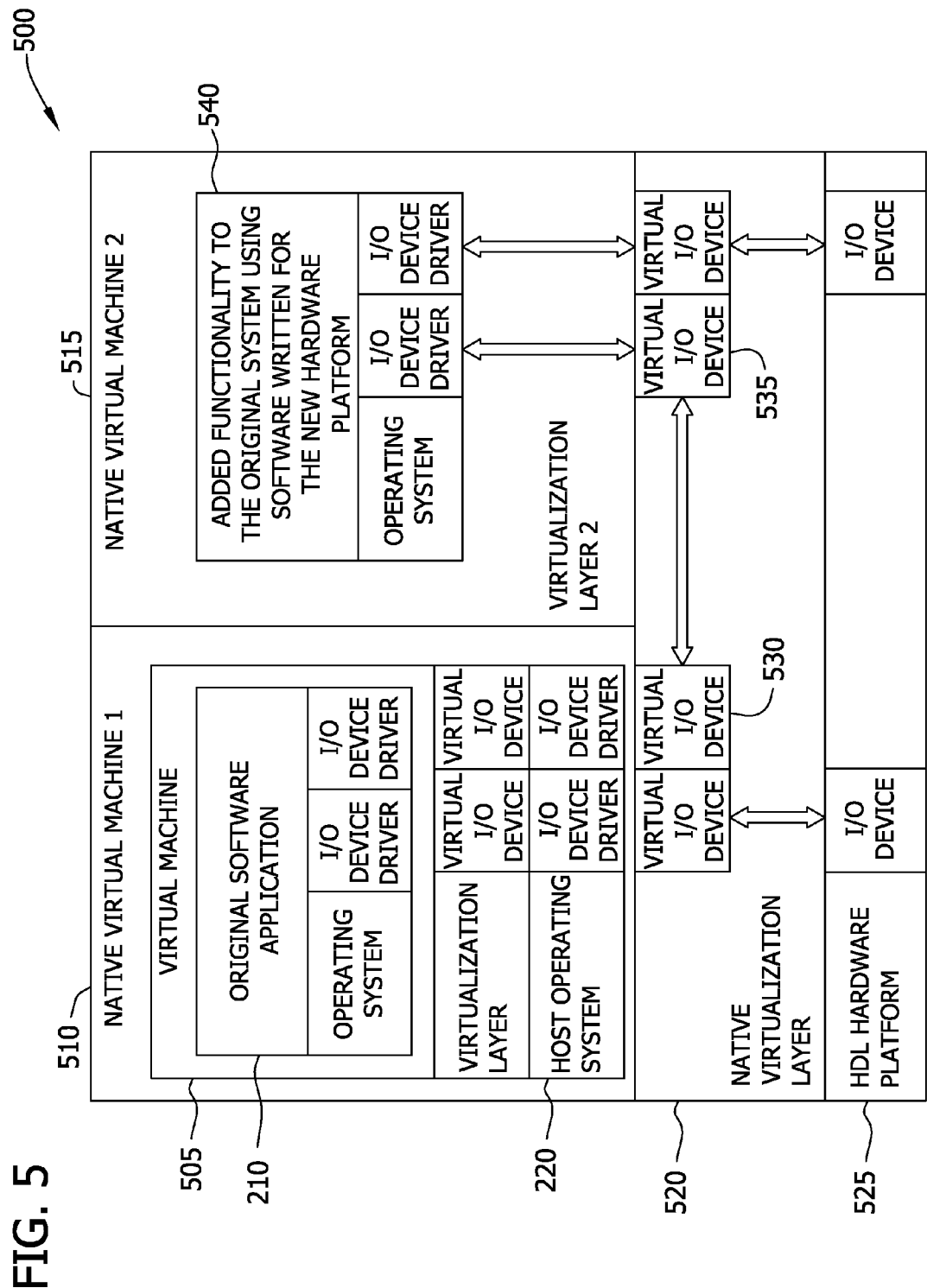
FIG. 5 is a block diagram of an exemplary configuration of a computing device that may be used to add functionality to a software application using a second virtual machine executed by a native virtualization layer.

In some embodiments, additional functionality may be supported with a second layer of virtualization. FIG. 5 is a block diagram of an exemplary configuration 500 of a computing device that may be used to add functionality to software application 210, which is executed by a first VM 505 within a first native VM 510, using a second native VM 515.

In exemplary embodiments, first native VM 510 and second native VM 515 access virtualized hardware provided by a native virtualization layer 520 that is executed directly (e.g., without an intervening OS) by an HDL hardware platform 525. For example, native virtualization layer 520 may provide a first virtual I/O device 530 to first native VM 510 and a second virtual I/O device 535, which is mapped to virtual I/O device 530, to second native VM 515. Accordingly, data, such as commands and/or requests, may be routed from original software application 210 to a second software application 540 executed by second native VM 515 to achieve an extension of functionality, as described above with reference to FIG. 4. The use of native VMs 510, 515 executed by a native virtualization layer 520 may facilitate improving system performance by removing levels of abstraction between software applications 210, 540 and HDL hardware platform 525.

Figure 6:
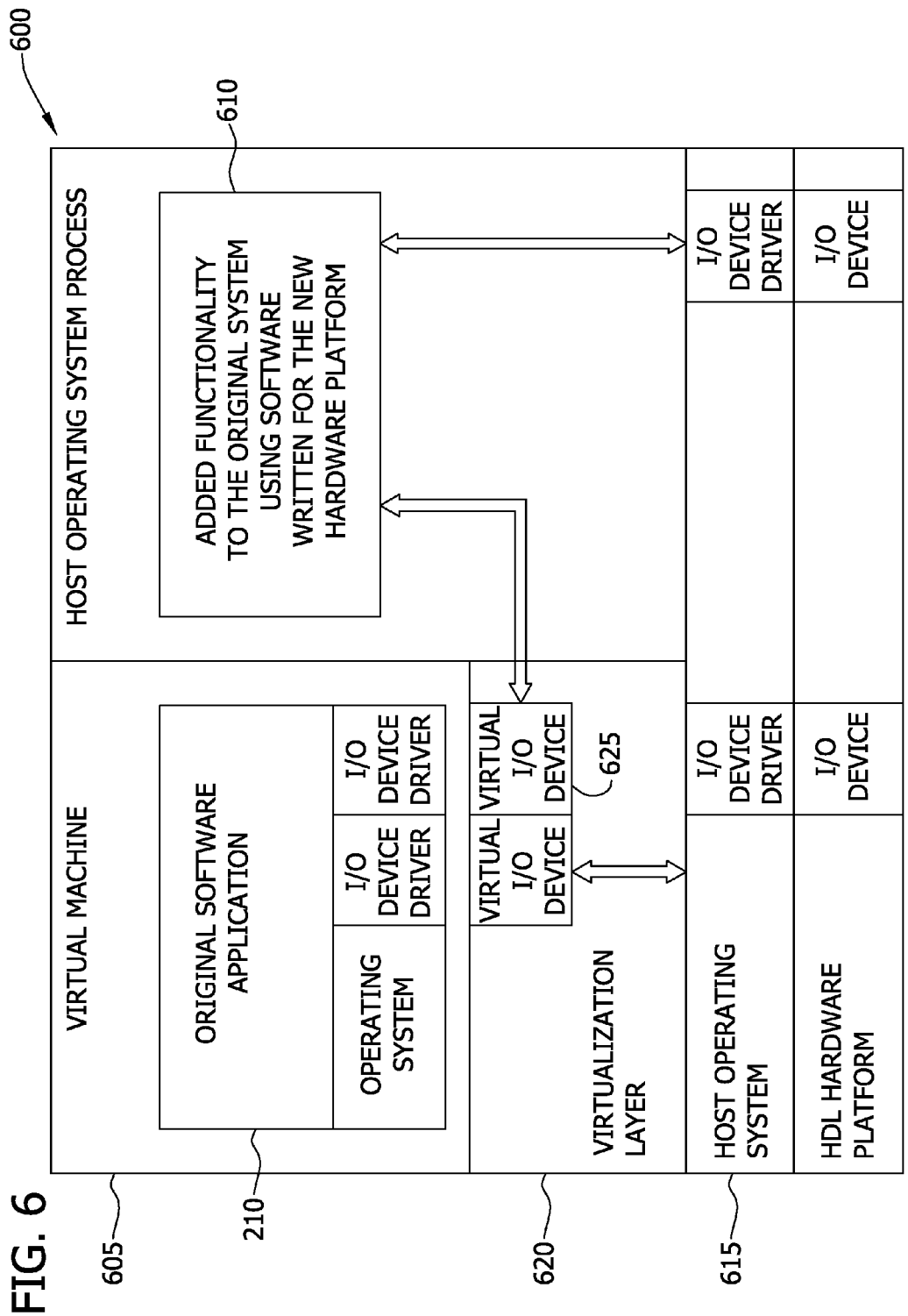
FIG. 6 is a block diagram of an exemplary configuration of a computing device that may be used to add functionality to a software application executed by a virtual machine using a second software application executed by a host OS that also executes the virtual machine.

In some embodiments, additional functionality may be supported by software executing directly in a host OS. FIG. 6 is a block diagram of an exemplary configuration 600 of a computing device that may be used to add functionality to software application 210, which is executed by a VM 605, using a second software application 610 executed by a host OS 615 that also executes VM 605. In exemplary embodiments, host OS 615 provides a virtualization layer 620 to VM 605. Virtualization layer 620 includes a virtual I/O device 625 by which software application 210 transmits data, such as commands and/or requests. Second software application 610 is configured to communicate directly with virtual I/O device 625, such that second software application 610 may extend the functionality of original software application 210 as described above with reference to FIG. 4.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for use in executing a software application that is executed by a target hardware platform, said method comprising:
    determining a hardware description language (HDL) description of the target hardware platform;
    configuring a programmable hardware component to be at least functionally equivalent to the target hardware platform based on the HDL description, such that compatibility of the software application with the programmable hardware component is achieved, including adding at least one additional assembly instruction that provides emulation acceleration to an assembly instruction set supported by the target hardware platform;
    executing, by the programmable hardware component, a native virtualization layer configured to route data between a first virtual I/O device that is associated with a first virtual machine (VM) within a first native virtual machine and a second virtual I/O device that is associated with a second native virtual machine; and
    executing the software application using the configured programmable hardware component.

2. A method according to claim 1, wherein executing the software application comprises:
    executing the first virtual machine (VM) using the configured hardware component; and
    executing the software application using the first VM.

3. A method according to claim 2, wherein the target hardware platform is a first hardware platform, and the software application is associated with a second hardware platform, said method further comprising configuring the first VM to provide a virtual hardware platform that emulates the second hardware platform.

4. A method according to claim 2, wherein the software application is a first software application, said method further comprising:
    executing a second software application using the configured programmable hardware component, wherein the second software application includes added functionality not included in the first software application; and
    routing data from the first software application to the second software application, wherein the data includes at least one of a request and a command.

5. A method according to claim 1, wherein configuring a programmable hardware component comprises programming a programmable hardware component.

6. A method for use in executing a software application using a virtual machine (VM), said method comprising:
    selecting a target hardware platform for execution of the VM, wherein the VM is a first virtual machine (VM) within a first native virtual machine;
    determining a hardware description language (HDL) description of the target hardware platform;
    programming a programmable hardware component based on the HDL description, such that compatibility of the software application with the programmable hardware component is achieved, including adding at least one additional assembly instruction that provides emulation acceleration to an assembly instruction set supported by the target hardware platform;
    executing, by the programmable hardware component, a native virtualization layer configured to route data between a first virtual I/O device that is associated with the first virtual machine (VM) within the first native virtual machine and a second virtual I/O device that is associated with a second native virtual machine; and
    executing the first VM within the first native virtual machine using the programmed programmable hardware component.

7. A method according to claim 6, further comprising executing a software application using the first VM executed by the programmed programmable hardware component, wherein the software application is certified to execute on the target hardware platform.

8. A method according to claim 7, wherein programming the programmable hardware component based on the HDL description comprises configuring the programmable hardware component to be at least functionally equivalent to the target hardware platform, and wherein the certification of the software application for execution by the target hardware platform is applicable to execution of the software application by the programmed programmable hardware component.

9. A method according to claim 6, wherein selecting the target hardware platform comprises selecting a hardware platform on which the software application is currently executed by a second VM.

10. A method according to claim 6, wherein selecting the target hardware platform comprises selecting a hardware platform on which the first VM is desired to execute.

11. A method according to claim 6, wherein executing the first VM comprises executing a first instance of the first VM using a first programmable hardware component that is associated with a first hardware specification, said method further comprising:
    programming a second programmable hardware component that is associated with a second hardware specification based on the HDL description; and
    executing a second instance of the first VM using the second programmable hardware component.

12. A method according to claim 11, wherein programming the second programmable hardware component based on the HDL description comprises configuring the second programmable hardware component to be functionally equivalent to the first programmable hardware component.

13. A method according to claim 12, wherein the software application is certified for execution on the first programmable hardware component, and configuring the second programmable hardware component to be functionally equivalent to the first programmable hardware component causes the certification of the software application for execution by the first programmable hardware component to be applicable to execution of the software application by the second programmable hardware component.

14. A method according to claim 11, further comprising:
    executing a first instance of the software application using the first instance of the first VM; and
    executing a second instance of the software application using the second instance of the first VM,
    wherein the software application is certified to execute on the target hardware platform described by the HDL description.

15. A device for use in executing a software application using a virtual machine (VM), said device comprising:

a storage device configured to store a virtual machine (VM) and a software application, wherein the VM is a first virtual machine (VM) within a first native virtual machine; and a programmable hardware component coupled to said storage device, wherein said programmable hardware component is programmed based on a hardware description language (HDL) description of a target hardware platform and supports at least one additional assembly instruction that provides emulation acceleration beyond an assembly instruction set supported by the target hardware platform, said programmable hardware component programmed to execute a native virtualization layer configured to route data between a first virtual I/O device that is associated with the first virtual machine (VM) within the first native virtual machine and a second virtual I/O device that is associated with a second native virtual machine and to execute the software application, wherein the software application is certified to be executed by at least one of the target hardware platform and the HDL description.

16. A device according to claim 15, wherein said programmable hardware component is at least functionally equivalent to the target hardware platform.

17. A device according to claim 15, wherein said programmable hardware component is programmed to execute the software application using the first VM.

18. A device according to claim 17, wherein said programmable hardware component is programmed based on an HDL description of a target hardware platform by which the software application is certified to be executed, and wherein the certification is applicable to execution of the software application by said programmable hardware component.

19. A device according to claim 17, wherein said programmable hardware component is programmed based on an HDL description by which the software application is certified to be executed, and wherein the certification is applicable to execution of the software application by said programmable hardware component.

* * * * *